(12) United States Patent
Tyson et al.

(10) Patent No.: US 10,728,062 B1
(45) Date of Patent: Jul. 28, 2020

(54) TECHNIQUES FOR IMPROVING HIGH-SPEED COMMUNICATIONS IN A COMPUTING SYSTEM

(71) Applicant: Nvidia Corporation, Santa Clara, CA (US)

(72) Inventors: Eric Tyson, Santa Clara, CA (US); Mohammad Mobin, Santa Clara, CA (US); Vishnu Balan, Santa Clara, CA (US); Hitendra Dutt, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/287,104

(22) Filed: Feb. 27, 2019

(51) Int. Cl.
*H04L 25/03* (2006.01)
*H04L 25/02* (2006.01)

(52) U.S. Cl.
CPC .... *H04L 25/03885* (2013.01); *H04L 25/0212* (2013.01); *H04L 25/03343* (2013.01); *H04L 25/03057* (2013.01)

(58) Field of Classification Search
CPC ........... H04L 25/0212; H04L 25/03057; H04L 25/03343; H04L 25/03885
See application file for complete search history.

(56) References Cited

U.S. PATENT DOCUMENTS

| 8,737,459 | B2 | 5/2014 | Sawey et al. | |
| 9,886,402 | B2 | 2/2018 | Hopgood et al. | |
| 2013/0230088 | A1* | 9/2013 | Arad | G01R 29/08 |
| | | | | 375/228 |
| 2014/0269881 | A1* | 9/2014 | He | H04L 25/03878 |
| | | | | 375/231 |

* cited by examiner

Primary Examiner — David B Lugo (57) ABSTRACT

In a computing system, various components/devices communicate with each other. For example, a microprocessor may communicate with memory or may communicate with another microprocessor over a link. Various factors such as the frequency and transmission speed of a signal can distort what is being communicated over a link. The problem becomes more pronounced as the transmission speed increases. To address this problem, devices on both ends of a link can cooperate to equalize the link. Equalization involves configuring the transmitting device to alter the signal being transmitted so that certain distortions introduced during transmission are negated by the time the signal arrives at the receiving device. Given that each link can have slightly different characteristics, appropriate equalization parameters need to be ascertained for each link. Introduced herein are improved techniques for performing equalization that are quick yet provide equalization parameters that are stable even in a noisy high-speed link.

26 Claims, 5 Drawing Sheets

TECHNIQUES FOR IMPROVING HIGH-SPEED COMMUNICATIONS IN A COMPUTING SYSTEM

TECHNICAL FIELD

This application is directed, in general, to transmitter equalization and, more specifically, to finding optimal transmitter parameters for a communication over a high-speed interconnect.

BACKGROUND

A link is a communication channel that connects devices of a single or multiple computing systems and allows them to communicate with one another. Various factors such as the frequency components of the signal, the speed of the transmission, and the types of chips, link and channels, can affect the signal quality and, in some instances, make the signal illegible for the devices at the receiving end. One technique to combat this has been to "equalize" the channel so that the frequency domain attributes of the signal at the input end are faithfully reproduced at the output end, resulting in fewer errors. High-speed interconnects, such as PCIe (especially gen5), USB, and NVLink™ provided by NVidia® Corporation of Santa Clara, Calif., use equalizers to prepare data signals for transmission.

SUMMARY

In one aspect, the disclosure provides a method for optimally equalizing a transmitting device and a receiving device sharing a link. The method includes comprising: determining a centroid of transmitter coefficients that are weighted by figures of merit (FOMs) of the transmitter coefficients, equalizing data of the transmitting device using optimal equalization coefficients that correspond to the centroid, and transmitting the data from the transmitting device to the receiving device over the link.

In another aspect, the disclosure provides transmitting device. The transmitting device includes a centroid calculator configured to determine a centroid of transmitter coefficients that are weighted by figures of merit (FOMs) of the transmitter coefficients, a finite impulse response (FIR) filter configured to equalize data of the transmitting device using optimal equalization coefficients that correspond to the centroid, and a transmitter configured to transmit the data to a receiving device over a link that is shared between the transmitting device and the receiving device.

BRIEF DESCRIPTION

Reference is now made to the following descriptions taken in conjunction with the accompanying drawings, in which.

DETAILED DESCRIPTION

For transmit equalization in a high-speed link, parameters known as transmitter (TX) coefficients can be used to tune the transmitting device. A typical system may have hundreds of combinations of TX coefficients, and some of these combinations will produce better equalization results than others. The signal quality is critically important in high-speed transmission channels, so selecting an optimal combination of TX coefficients is crucial to ensure accurate transmissions.

In addition, selecting this combination must be done within a fixed time limit so that the system can boot up or begin other processes. Testing every combination of TX coefficients to find the best one is unfeasible, as this approach will usually take too much time. Testing only some of TX coefficients is not preferred as it will often lead to selecting a suboptimal combination. Accordingly, what is needed in the art is a technique that tests and selects optimal TX coefficients for a high-speed link in a more efficient manner.

Introduced herein is an improved technique for selecting optimal TX coefficients for a high-speed link in a time-efficient manner. Testing and weighting a relatively small number of TX coefficients with a broad coverage of TX coefficient space, the introduced technique can determine optimal TX coefficients without spending too much time.

The introduced technique tests presets of TX coefficients that cover a region of TX coefficient space that includes TX coefficients providing good signal quality. Testing each preset involves temporarily setting the finite impulse response (FIR) filter of a transmitting device with the presets and sending training data from the transmitting device to the receiving device, e.g., link partner, for each preset. The receiving device adapts to the training data and measures its quality as a figure of merit (FOM) for each preset.

As the FOMs of the presets are being read back to the transmitting device, the transmitting device starts calculating a centroid of the presets weighted by the FOMs. The centroid calculated from the FOMs of the presets is called a coarse centroid as it is coarser than another (fine) centroid that is calculated later. The transmitting device then selects fine points around the coarse centroid in the TX coefficient space/map.

Using the TX coefficients associated with the fine points, the transmitting device updates the FIR filter and transmits a set of training data to the receiving device for each fine point. Similar to the presets, the receiving adapts to the data and measures its FOM for each fine point. Again, the FOM of the fine points are read back and the transmitting device calculates a fine centroid of the fine points weighted by the received FOMs.

The transmitting device determines TX coefficients that correspond to the fine centroid and configures the FIR using such coefficients. As configured, the FIR filter optimally equalizes an output of the transmitting device to overcome the adverse effects of the link.

Unlike the conventional techniques, e.g., a hill climbing technique, which are limited to selecting the best TX coefficients from a given TX coefficients by making incremental changes to the given TX coefficients until no improvement can be made to the output, the introduced technique are not limited to only those TX coefficients it starts with. By determining a centroid of the starting TX coefficients weighted by their signal qualities, the introduced technique also covers TX coefficient regions that surround the starting TX coefficients. Moreover, as the centroid represents a center of a high-quality TX coefficient space, the introduced technique provides TX coefficients that are more stable and resilient to the adverse effects in the link, such as noise.

Figure 1:
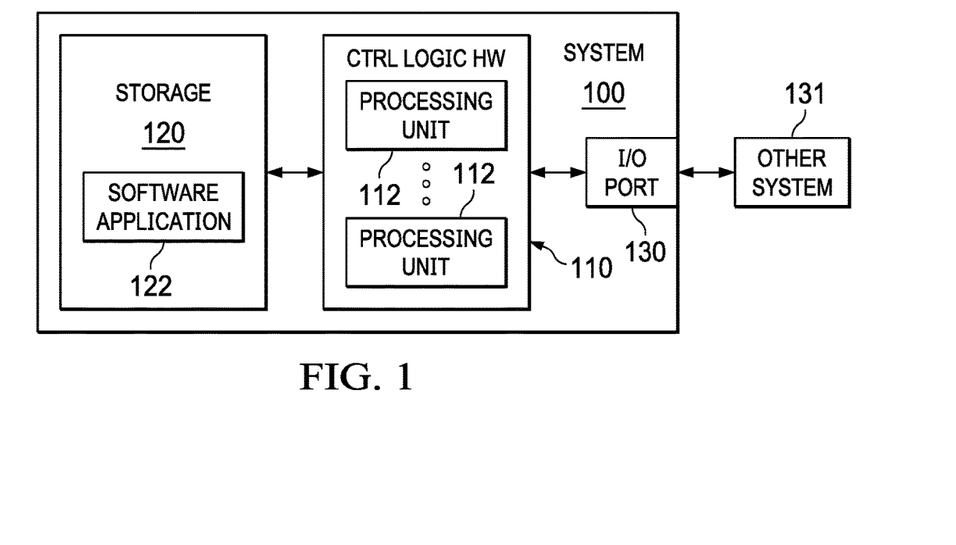
FIG. 1. illustrates a block diagram of an embodiment of a computing system according to the principles of the disclosure.

FIG. 1 illustrates a block diagram of an embodiment of a computing system 100 in accordance with the principles of the disclosure. The system 100 is a computing system that includes various component devices that are interconnected using high-speed interconnects. The system may be implemented within a single server, across multiple servers within a single rack, or across multiple server racks.

The computing system 100 comprises a control logic hardware 110, e.g., a megacell or a system-on-chip (SoC), including multiple processing units 112s (only two are shown for clarity), a storage 120, and an input/output (I/O) port 130. The processing unit 112 can include one or more of processors such as a central processing unit (CPU), graphics processing unit (GPU) or any other general or special processing unit. The storage 120 can be random access memory (RAM), flash memory, or disk storage 120 that stores one or more software applications 122 such as system driver software that, when executed by the control logic hardware 110, can cause any of the component devices in the computing system 100 to perform any suitable function. The I/O port 130 allows the system 100 to communicate internally and externally.

Using respective transmitters and receivers, various component devices of the computing system 100 can communicate locally (for example, between the component devices within the same computing system such as 100) or externally (for example, with component device(s) in other computing system 131). The communications may be made over a high-speed interconnect such as PCIe, USB, and NVLink™. Symbols are used to convey data, and channel characteristics limit the rate at which the symbols can be successfully conveyed due to inter-symbol interference (ISI). The introduced technique can reduce the ISI at the receiver, for example, by using pre-cursor emphasis and post-cursor emphasis to compensate for characteristics of the channel used for the transmission. The introduced technique may be implemented in the system driver software or in an embedded microcontroller in the component devices.

Figure 2:
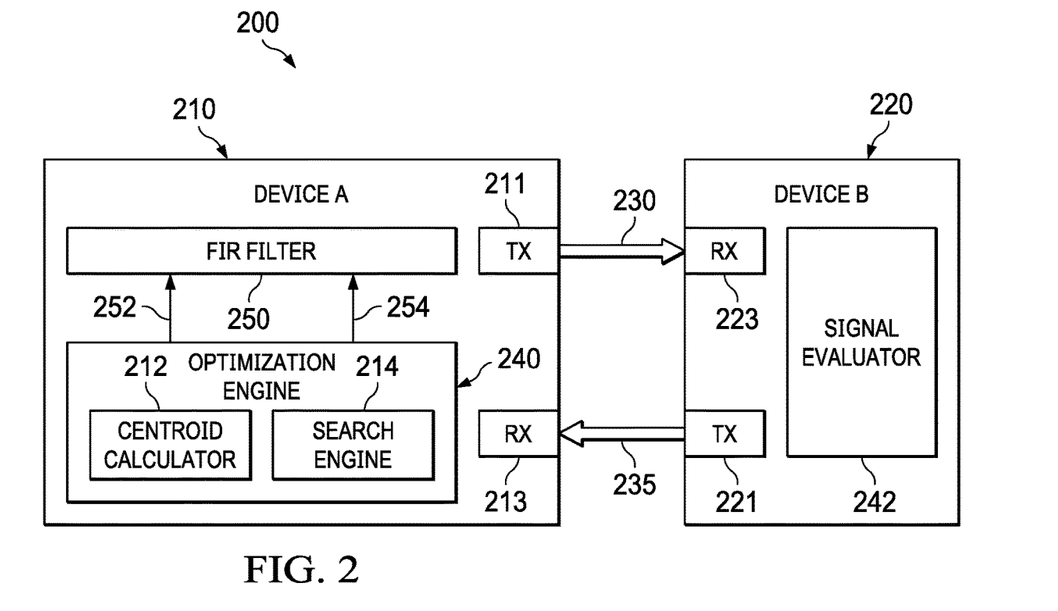
FIG. 2 illustrates a block diagram of an embodiment of devices sharing a link according to the principles of the disclosure.

FIG. 2 is a block diagram illustrating an embodiment of pair of interconnected devices, device A 210 and device B 220. The devices 210, 220 may located in a same computing system or in different computing systems. The devices 210 and 220 communicate using respective pairs of transmitters (TX) 211, 221 and receivers (RX) 213, 223 over a link, which includes a channel 230 and a back channel 235. In the illustrated embodiment, the devices 210, 220 are considered as link partners as they share the link. As the equalization process of the link is controlled by the device A 210, the device A 210 is also considered as the master of the link. The device A 210 includes a FIR filter 250 and an optimization engine 240 that includes a centroid calculator 212 and a search engine 214, and the device B 220 includes a signal evaluator 242. It is understood that the optimization engine 240 including the centroid calculator 212 and the search engine 214 may be implemented by a processor in the device A 210 or a microcontroller thereof, and the signal evaluator 242 may be implemented by a processor in the device B 220 or a microcontroller thereof.

Using each set of transmitter (pre and/or post cursor tap) coefficient presets, the optimization engine 240 configures the FIR filter 250. Multiple presets are selected before the configuration starts, for example, based on empirical testing of TX coefficients to be used on the channel 230. The presets are selected from a TX coefficient map of TX coefficient space to be not only a valid tuple but also to be in a valid minimum and maximum coefficient range and signal level limits. The presets may include pairs of a pre-cursor coefficient and/or post-cursor coefficient, and the FIR filter 250 is configured by a pair of corresponding pre-cursor tap 252 and/or post-cursor tap 254. The pre and post-cursor coefficients represent unit interval delays applied to respective taps.

For each preset, the device A 210 transmits via the transmitter 211 a set of training data, e.g., pseudorandom bit sequence (PRBS), across the channel 230 to the receiver 223 of the device B 220. The device B 220 adapts to the received data and using the signal evaluator 242, determines FOM for each preset. The FOM may be determined by, for example, measuring an eye margin, e.g., height or width, of an electronic representation of the training data for each preset. The FOM may also be determined by measuring other values for each set, e.g., Signal to Noise Ratio (SNR) or Bit Error Rate (BER) of the training data. The FOM may be any numeric form as long as it has a monotonic relationship with the TX coefficient space/map. The device B 220 transmits, using the transmitter 221, the FOM of each preset across back channel 235 to the receiver 213 of the device A 210. Back channel 235 is not necessarily of the same type or speed as the channel 230.

Using the received FOMs, the centroid calculator 212 calculates a centroid of the presets weighted by the FOMs. The centroid is calculated by accumulating products between the presets and the FOMs of the presets that are raised to the power of the FOM weight, and dividing such accumulated products with the FOMs of the presets that are raised to the FOM weight.

The centroid calculated from the FOMs of the presets is called a coarse centroid as it is coarser than another (fine) centroid that is calculated later. The search engine 214 then searches and selects fine points around the coarse centroid in the TX coefficient space/map. The fine points may be selected using a fine delta, e.g., a number of fine points in a fixed distance from the coarse centroid, or an equation that calculates a fine delta displacement from the coarse centroid. The FOM weight and the fine delta are fixed parameters for the centroid calculation.

Using the TX coefficients associated with the fine points, the device A 210 updates the FIR filter 250 and transmits a set of training data, e.g., PRBS, to the device B 220 for each fine point. Similar to the presets, the device B 220 adapts to the data and uses the signal evaluator 242 to a figure of merit (FOM) for the received data of each fine point.

The device B 220 transmits, using its transmitter 221, the FOM of each fine point to the receiver 213 of the device A 210 across the back channel 230. This time, the centroid calculator 212 calculates a fine centroid of the fine points weighted by the received FOMs. This calculation is similar to the coarse centroid calculation as discussed above.

The search engine 214 determines TX coefficients that correspond to the fine centroid using the TX coefficient map. The optimization engine 240 configures the FIR using the TX coefficients of the fine centroid. As configured, the FIR filter 250 optimally equalizes an output of the device A 210 to overcome the actual effects of the channel 230.

In the illustrated embodiment, two centroids are calculated and used for the equalization. While calculating and using two centroids generally results in more accurate TX coefficients than one centroid, the benefit of finding not only accurate but more stable TX coefficients can still be reaped from one centroid. The number of the centroids, hence, is not limited to two and it can be any number under the given time constraint.

Figure 3A:
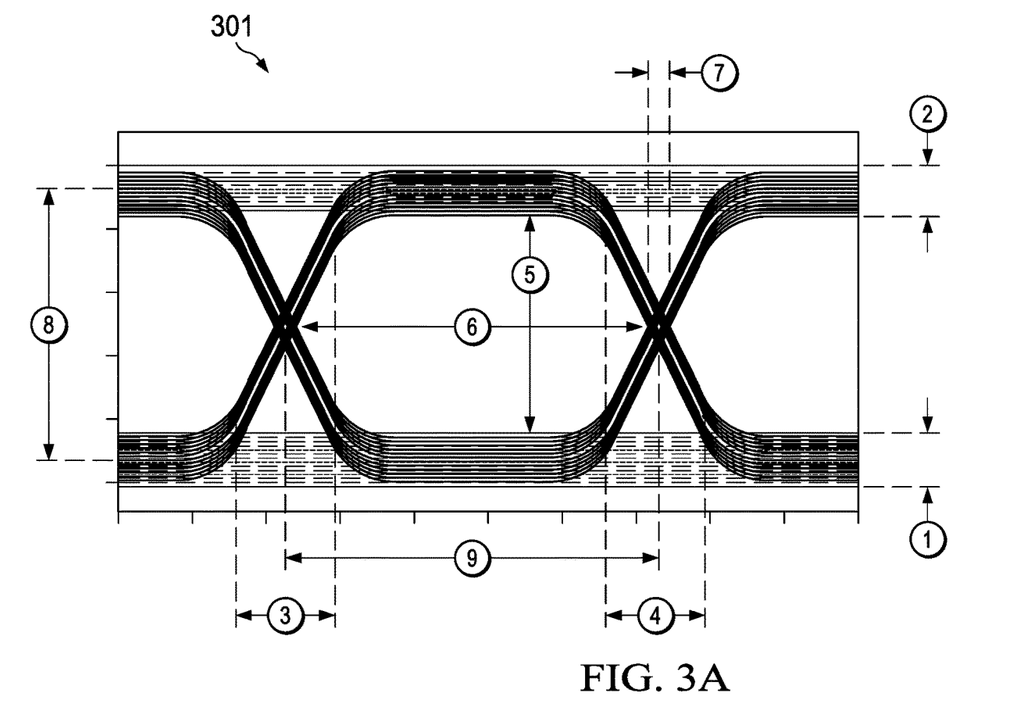
FIG. 3A illustrates an eye diagram of non-return-to-zero (NRZ) signal from an oscilloscope probed at a receiving device according to the principles of the disclosure.
Figure 3B:
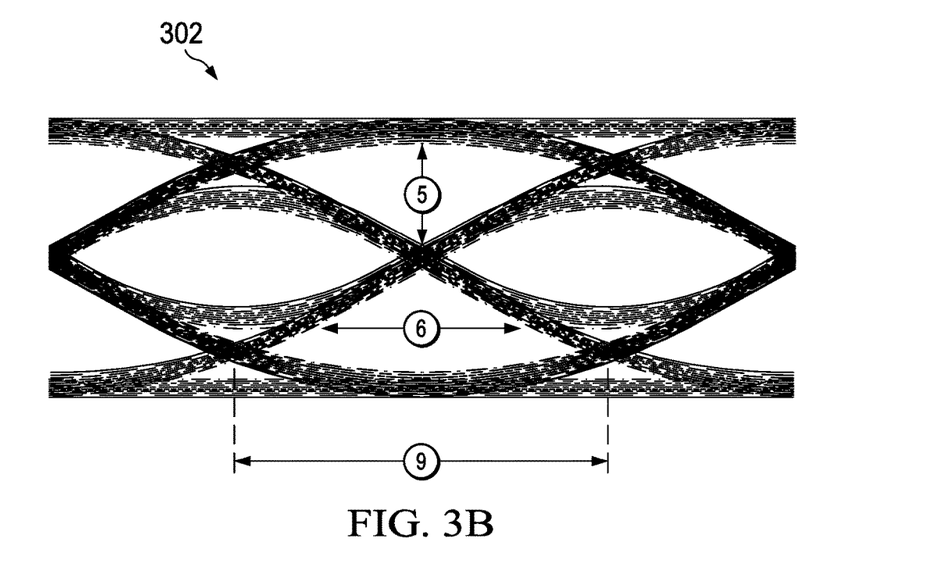
FIG. 3B illustrates an eye diagram of partial response signal from an oscilloscope probed at a receiving device according to the principles of the disclosure.

FIGS. 3A and B are eye diagrams of non-return-to-zero (NRZ) signal 301 and partial response (PR) signal 302 from an oscilloscope probed at a receiving device of a shared link. Measurement #5 is the eye height. The eye height provides a measure of the equalized eye and the impact of the noise or interference in the channel. As the interference increases, the "eye" appears to close and the eye height measurement becomes smaller. As the interference decreases, the eye height measurement becomes larger. Thus the eye height can be measured and used as a FOM for the quality of the transmissions on a channel. It is understood by person having ordinary skill in the art that other measurements shown in the eye diagram (measurements 1-4 and 6-9) can be also used to derive a FOM for the quality of the transmission on the channel. Also as understood by a person having ordinary skill in the art, the above discussion of the eye characteristics is equally applicable to other type of signals such various types of pulse-amplitude modulation (PAM) signal.

Figure 4A:
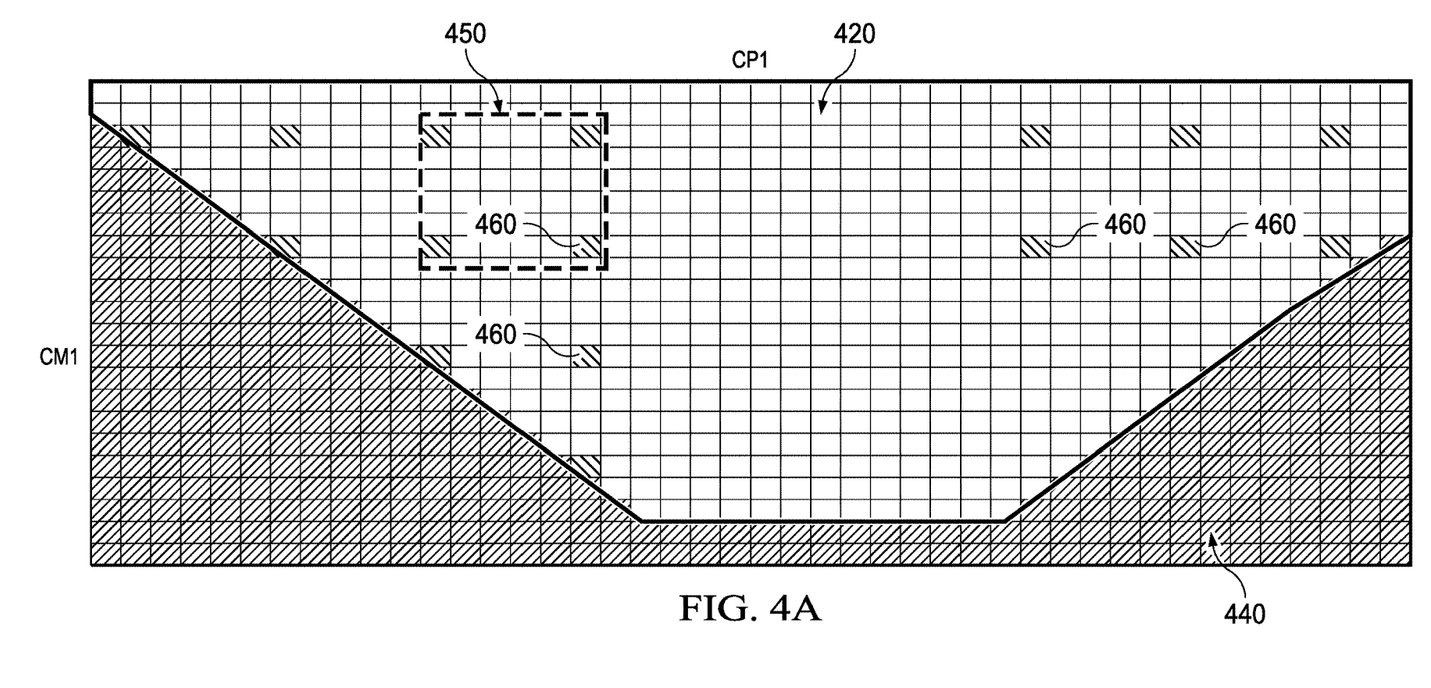
FIG. 4A illustrates an embodiment of a transmitter coefficient map according to the principles of the disclosure.

FIG. 4A illustrates an embodiment of a transmitter coefficient map 400 of coefficient space showing presets 460 of transmitter coefficients. The map 400 illustrates the postcursor coefficient (CP1) on the x-axis and the precursor coefficient (CM1) on the y-axis. The cursor assignment of x and y axes may change based on each implementation. In the illustrated embodiment, each point on the map 400 thus represents a combination of a precursor and a postcursor. The map 400 includes valid transmitter coefficient space 420 and invalid coefficient space 440. Shaded entries 460 in the valid transmitter coefficient space 420 indicate the presets that are used to initially configure the FIR and to determine a coarse centroid.

Figure 4B:
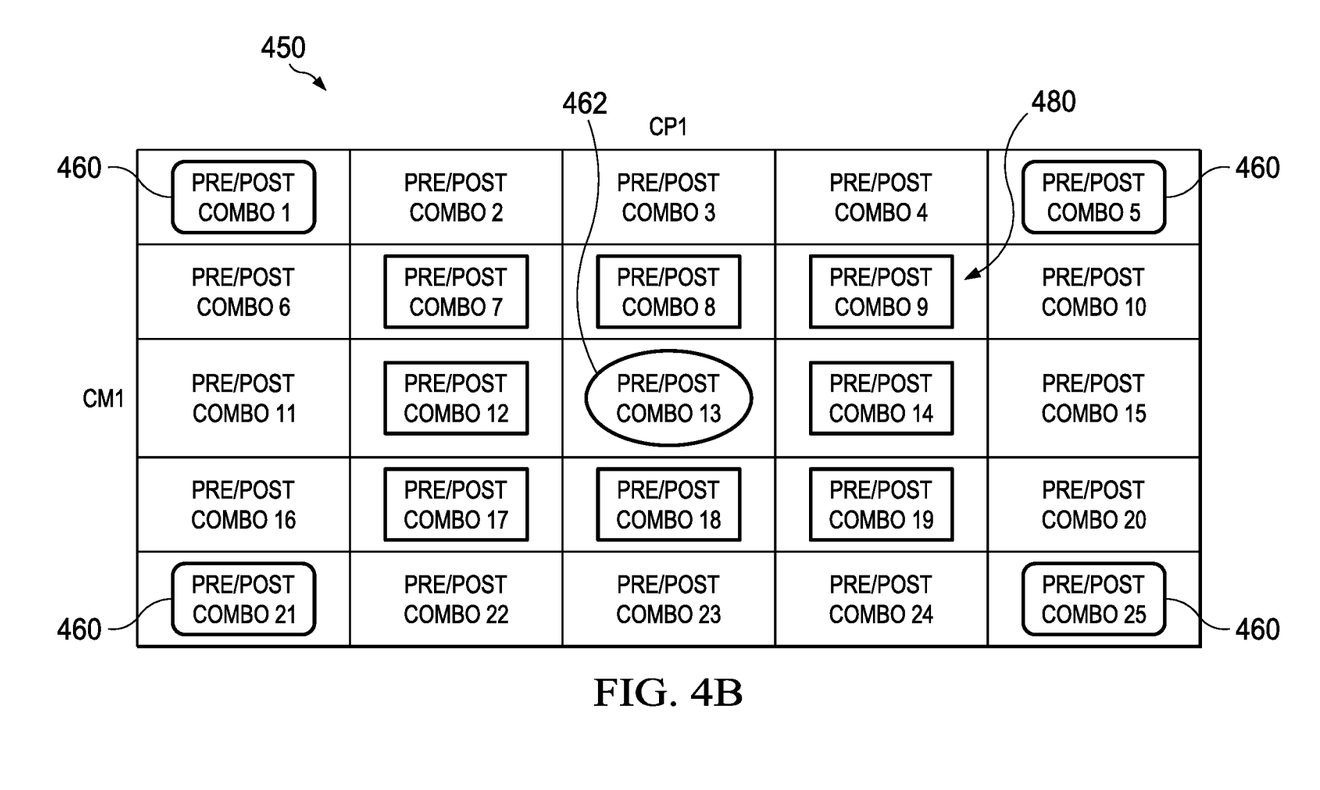
FIG. 4B illustrates a section of the transmitter coefficient map in FIG. 4A.

FIG. 4B illustrates a section 450 of the transmitter coefficient map 400 in FIG. 4A, showing some of the presets 460 and fine points 480 around the coarse centroid 462. Rectangular entries 480 around the centroid 462 represent the fine points 480 that have been selected using a fine delta parameter. In FIG. 4B, 8 fine points are selected around the centroid 462 based on a fine delta value of 2. It is understood that while the coefficient maps and spaces are not limited to 2 dimensions and can be defined using more dimensions.

Figure 5:
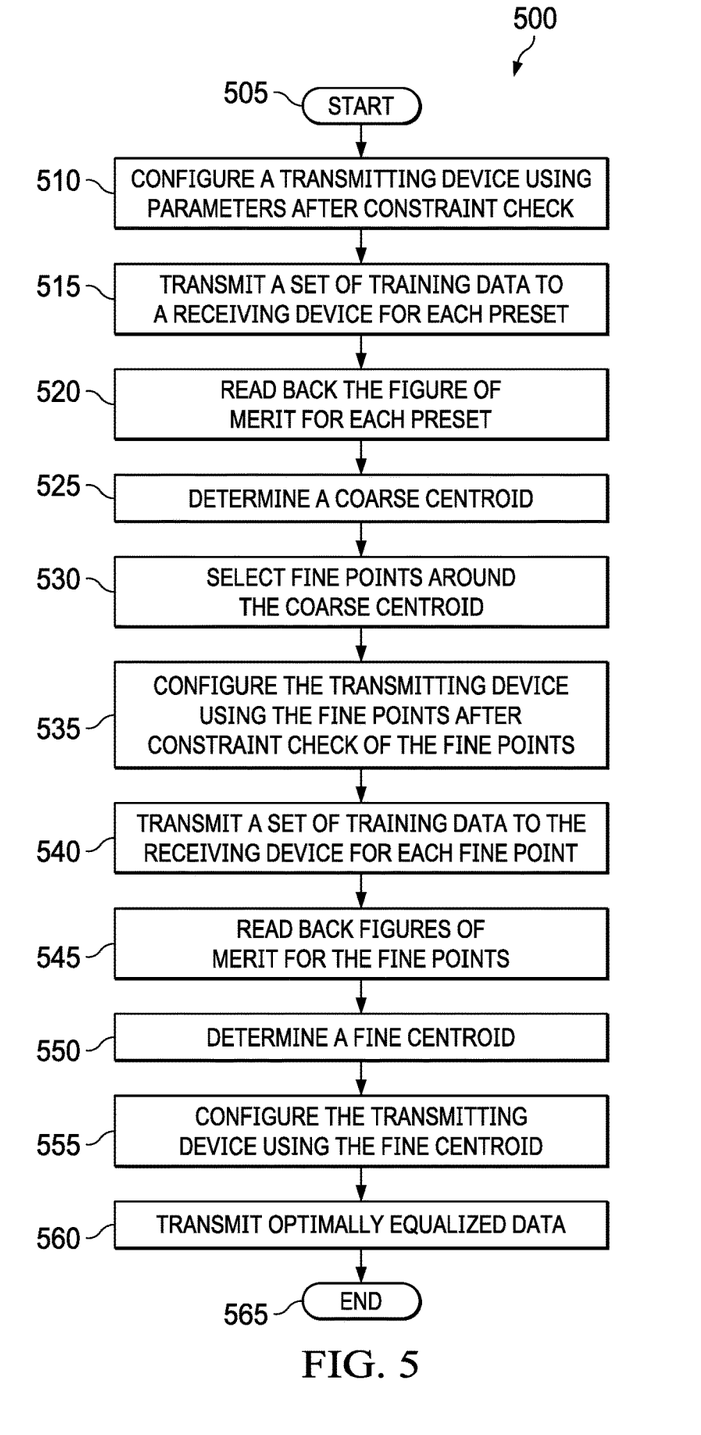
FIG. 5 illustrates a flow chart of an embodiment of an equalization method carried out according to the principles of the disclosure.

FIG. 5 illustrates a flow chart of an embodiment of a method 500 for optimally equalizing interconnected devices/units that share a link, such as a high speed serial link. Of the devices or units that share the link, one that initiates and drives the equalization process, such as 210 in FIG. 2, is referred herein as "transmitting device" and the other one that responds, such as 220 in FIG. 2, is referred as "receiving device." The method 500 is performed by a processor or a microcontroller of the transmitting device. In one embodiment, the method 500 may be a series of instructions in system driver software that is stored in non-transitory medium such as 120 in FIG. 1. The method 500 starts at step 505.

At step 510, the transmitting device is initially configured using parameters that are fixed for the centroid calculation algorithm being used. The parameters include presets of TX coefficients, a weight for centroid calculation (weightMode), a delta for fine point calculation (fineDelta), tiebreaker (tieBreak) for searching the coefficient map/space, and rounding options (roundOption) for choosing nearest valid TX coefficients. As mentioned above, the presets may be selected from points in a transmitter coefficient map such as 400 in FIG. 4. Also during the step 510, an additional constraint check is performed so that the TX coefficients that violate coefficient min or max range and signal level limits are discarded from the presets.

At step 515, for each preset, the transmitting device transmits a set of training data, to the receiving device for a period of time. The transmitted training data may be a PRBS or a set of scrambled data. The receiving device adapts to the received data and measures the quality of the received data. A signal evaluator in the receiving device, such as 242 in FIG. 2, can determine the quality of the received training data and quantify it as FOM, such as an eye opening metric in FIGS. 3A and B. At step 520, the FOMs are read back to the transmitting device. A FOM of each preset is read back after each receiving device adaptation.

At step 525, using the FOMs and the weight mode (weightMode) parameter provided in the step 510, a coarse centroid of the presets is determined. The coarse centroid may be calculated by a centroid calculator such as 212 in FIG. 2. It is noted the calculations are made as each FOM is read back and not calculated at once after all the FOMs are read back. This alleviates the space limitation of the memory and allows the memory to be used more efficiently.

For a Linear Weighted Centroid, i.e., when the weightMode is set as Linear or zero, and the coordinates of the coarse centroid in the coefficient space/map are calculated by Equation 1 below:

$$X = \frac{\sum_{i}^{N} X(i)}{\sum_{1}^{N} 1}, \quad Y = \frac{\sum_{i}^{N} Y(i)}{\sum_{1}^{N} 1}$$

For a FOM weighted centroid, i.e., when the weightMode is set as FOM or 1, the coordinates are calculated by Equation 2 below:

$$X = \frac{\sum_{i}^{N} X(i) * FOM(i)}{\sum_{1}^{N} FOM(i)}, \quad Y = \frac{\sum_{i}^{N} Y(i) * FOM(i)}{\sum_{1}^{N} FOM(i)}$$

For a FOM square weighted centroid, i.e., when the weightMode is set as FOMsquare or 2, the coordinates are calculated by Equation 3 below:

$$X = \frac{\sum_{i}^{N} X(i) * FOM(i)^2}{\sum_{1}^{N} FOM(i)^2}, \quad Y = \frac{\sum_{i}^{N} Y * FOM(i)^2}{\sum_{1}^{N} FOM(i)^2}$$

It is understood that the weightMode is not limited to 0, 1 and 2 and can be, for example, any positive integer.

When the calculated coordinates of the centroid involve fractions, the fractions may be rounded up or down based on one of the chosen rounding option (roundOption) so that they can mapped to a point in the coefficient space/map that the hardware can support. For example, the fraction is always rounded down when floor( ) is chosen; the fraction is always rounded up when ceil( ) is chosen, and the fraction is rounded up when it greater than or equal to 0.5 and rounded down when it is less than 0.5.

Alternatively, when the weightMode is set as peakSearch, the step 525 searches through each of the presets in the coefficient space/map by comparing one preset to another and selecting one with a better FOM. The coordinates of the last remaining preset is used as the coordinates of the coarse centroid. It is understood that as the peakSearch does not involve averaging as the above weight modes using specific weights, the peakSearch can find better TX coefficients for links, especially for links that do not have any noise or have only negligible noise.

During the search, when two presets yield the same FOM, the step 525 uses a tiebreaker option to select one. For example, when "greater" is used as the tiebreaker, the coordinates of the current preset is maintained as the "best" preset (one with the best FOM) until a new preset with a better FOM is found. But when "greater than equal to" is used as the tiebreaker, the coordinates of a new preset is selected as the best preset even if the new preset's FOM is same as the current one. Based on the tiebreaker option used, the end result may be biased toward the earlier presets, e.g., the presets closer to the starting point under the "greater" tiebreaker, or the later (more recent) presets, e.g., the presets that are farther away from the starting point under the "greater than equal to" tiebreaker. Using this tendency, the search can be programmed to create a bias toward the preset with higher or lower cursor value, e.g., pre or post cursor value, making either the transmitting device or the receiving device work harder during equalization. As one can deduce, the starting point and directions, e.g., X and Y direction, of the peakSearch also affect the bias created by the search.

At step 530, using the coordinates of the coarse centroid, fine points around the coarse centroid are selected. The step 530 may be performed by a search engine of the transmitter, such as 214 in FIG. 2.

The number of fine points selected is determined by Equation 4 below: $f=(2n+1)^2$, where n is a fine delta (fine-Delta) parameter provided in the step 510. The number of the fine points includes the point that corresponds to the coarse centroid. As such, when n is set 0, as the point that corresponds to the coordinates of the coarse centroid counts as a point, no other fine points are selected; when n is 1, 8 fine points that are in a fixed, e.g., equal, distance from the centroid are selected; when n is 2, 24 points that are in a fixed distance from the centroid are selected. The fine delta n is not limited to 2, and it can be greater than 2 in some embodiments. The FOM weight and the fine delta are fixed parameters for the centroid calculation. It is understood that the number of selected fine point may also be determined differently, for example by looking up from a table other, and a fine delta displacement from the coarse centroid may also be determined differently using an equation.

At step 535, the transmitting device is configured using the fine points. Similar to the step 510, the FIR filter in the transmitting device is configured with the TX coefficients associated with each fine points selected at the step 530. Each fine point is constraint-checked against the coefficient min or max range and signal level limits before configuring the FIR filter. Once configured, the transmitting device transmits training data, e.g., PRBS, to the receiving device for each fine point at step 540.

At step 545, the receiving device adapts to the transmitted training data and measures its quality. Similar to the step 520, the quality is represented as a FOM and read back to the transmitter. Each FOM is read back after each adaptation of each fine point.

At step 550, using the FOMs, a fine centroid is calculated. The calculations are made as each FOM is read back and not calculated at once after all the FOMs are read back. Similar to the step 525, the fine centroid may be calculated using one of the equations 1)-3) based on the weight, or using the peakSearch method.

In the method 500, two centroids are calculated and used. The number of the centroids is not limited to two and it can be any number under the given time constraint. As such, the steps 530-550 may be skipped for one centroid or repeated for three or more centroids depending on the time constraint.

At step 555, using the TX coefficients associated with coordinates of the fine centroid, the FIR filter of the transmitting device is configured. As the centroid represents TX coefficients that are in the center of a region that is defined by the weighted TX coefficients, they are not only high-quality TX coefficients but also more stable TX coefficients that are more resilient to the noise.

Using the FIR filter, data is transmitted from the transmitting device to the receiving device over the link at step 560. The FIR filter optimally equalizes data of the transmitting device to overcome the adverse effects encountered in the link. The method 500 ends at step 565.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method for optimally equalizing a transmitting device and a receiving device sharing a link, comprising:
   determining a coarse centroid of coarse transmitter coefficients that are weighted by figures of merit (FOMs) of said coarse transmitter coefficients;
   determining a fine centroid of fine transmitter coefficients that are within a fixed distance from said coarse centroid in a coefficient space;
   equalizing data of said transmitting device using equalization coefficients that correspond to said fine centroid; and
   transmitting said data from said transmitting device to said receiving device over said link.

2. The method of claim 1, wherein said coarse transmitter coefficients are preset transmitter coefficients for said transmitting device.

3. The method of claim 1, wherein said fine transmitter coefficients are at an equal distance away from said coarse centroid in said coefficient space.

4. The method of claim 1, further comprising configuring said transmitting device using centroid calculation parameters, which include a FOM weight, a fine delta, and a rounding option.

5. The method of claim 4, wherein said fine transmitter coefficients are selected based on said fine delta.

6. The method of claim 4, wherein said fine transmitter coefficients are weighted by raising FOMs of said fine transmitter coefficients to the power of said FOM weight that is equal to or greater than zero.

7. The method of claim 4, wherein said equalization coefficients are rounded up or down based on said rounding option.

8. The method of claim 1, wherein said coarse and fine transmitter coefficients correspond to either a pair of precursors or a pair of a precursor and a postcursor.

9. The method of claim 1, wherein said determining said fine centroid includes dividing an accumulation of products between said fine transmitter coefficients and weighted FOMs of said fine transmitter coefficients with an accumulation of said weighted FOMs of said fine transmitter coefficients.

10. The method of claim 1, wherein said determining said coarse centroid includes selecting a set of said transmitter coefficients that provides the best FOM.

11. The method of claim 10, wherein when multiple sets of said coarse or fine transmitter coefficients provide a same FOM, one of said multiple sets is selected based on a tiebreaker option.

12. The method of claim 1, wherein said FOMs of said coarse transmitter coefficients are determined based on an adaptation of said receiving device to training data transmitted by said transmitting device using said coarse transmitter coefficients.

13. The method of claim 12, wherein said FOMs of said coarse transmitter coefficients represent characteristics of said adaptation, and each of said FOMs of said coarse transmitter coefficients is based on at least one of:
   a height of an eye in said adaptation;
   a width of said eye in said adaptation;
   a product of said height and said width;
   Bit Error Rate of said training data at said receiving device; and
   Signal to Noise ratio of said training data at said receiving device.

14. A transmitting device comprising:
   a centroid calculator configured to determine a coarse centroid of transmitter coefficients that are weighted by figures of merit (FOMs) of said transmitter coefficients and a fine centroid of fine transmitter coefficients that are within a fixed distance from said coarse centroid in a coefficient space;
   a finite impulse response (FIR) filter configured to equalize data of said transmitting device using equalization coefficients that correspond to said fine centroid; and
   a transmitter configured to transmit said data to a receiving device over a link that is shared between said transmitting device and said receiving device.

15. The transmitting device of claim 14, wherein said coarse transmitter coefficients are preset coefficients of said FIR filter.

16. The transmitting device of claim 14, wherein said fine transmitter coefficients are at an equal distance away from said coarse centroid in said coefficient space.

17. The transmitting device of claim 14, wherein said centroid calculator is configured using centroid calculation parameters, which include a FOM weight, a fine delta, and a rounding option.

18. The transmitting device of claim 17, wherein said fine transmitter coefficients are selected based on said fine delta.

19. The transmitting device of claim 17, wherein said fine transmitter coefficients are weighted by raising FOMs of said fine transmitter coefficients to the power of said FOM weight that is equal to or greater than zero.

20. The transmitting device of claim 17, wherein said equalization coefficients are rounded up or down based on said rounding option.

21. The transmitting device of claim 14, wherein said coarse or fine transmitter coefficients correspond to either a pair of precursors or a pair of a precursor and a postcursor.

22. The transmitting device of claim 14, wherein said centroid calculator is configured to determine said fine centroid by dividing an accumulation of products between said fine transmitter coefficients and weighted FOMs of said fine transmitter coefficients with an accumulation of said weighted FOMs of said fine transmitter coefficients.

23. The transmitting device of claim 14, wherein said centroid calculator is configured to determine said coarse centroid by selecting a set of said coarse transmitter coefficients that provide the best FOM.

24. The transmitting device of claim 23, wherein when multiple sets of said coarse or fine transmitter coefficients provide a same FOM, one of said multiple sets is selected based on a tiebreaker option.

25. The transmitting device of claim 14, wherein said FOMs of said coarse transmitter coefficients are determined based on an adaptation of said receiving device to training data transmitted by said transmitter using said coarse transmitter coefficients.

26. The transmitting device of claim 25, wherein said FOMs of said coarse transmitter coefficients represent characteristics of said adaptation, and each of said FOMs of said coarse transmitter coefficients is based on at least one of:
- a height of an eye in said adaptation;
- a width of said eye in said adaptation;
- a product of said height and said width;
- Bit Error Rate of said training data at said receiving device; and
- Signal to Noise ratio of said training data at said receiving device.

* * * * *